(12) United States Patent
McFarland et al.

(10) Patent No.: US 7,296,123 B2
(45) Date of Patent: Nov. 13, 2007

(54) ELECTRONIC CONTROL UNIT ANALYSIS

(75) Inventors: Bernard M. McFarland, Warren, IN (US); John K. Moyer, Fishers, IN (US); Darrell T. Lubben, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 369 days.

(21) Appl. No.: 11/048,436

(22) Filed: Feb. 1, 2005

(65) Prior Publication Data

US 2006/0174072 A1    Aug. 3, 2006

(51) Int. Cl.
*G06F 12/00* (2006.01)
(52) U.S. Cl. ...................................... 711/154
(58) Field of Classification Search ................ 711/154; 717/127, 128
See application file for complete search history.

(56) References Cited

U.S. PATENT DOCUMENTS

| | | | | |
|---|---|---|---|---|
| 4,845,615 A | * | 7/1989 | Blasciak ...................... | 714/10 |
| 5,748,878 A | * | 5/1998 | Rees et al. ...................... | 714/38 |
| 5,903,759 A | * | 5/1999 | Sun et al. ................... | 717/128 |
| 6,047,390 A | * | 4/2000 | Butt et al. ..................... | 714/43 |
| 6,256,775 B1 | * | 7/2001 | Flynn .......................... | 717/127 |

* cited by examiner

*Primary Examiner*—Hiep T. Nguyen
(74) *Attorney, Agent, or Firm*—Jimmy L. Funke

(57) ABSTRACT

A system for acquiring information on the operation of an electronic control unit (ECU) includes a controller and a non-volatile memory. The controller is coupled to address and data buses of a central processing unit (CPU), which is located within an electronic control unit (ECU). The controller includes a register and/or a logging buffer for facilitating ECU analysis. The non-volatile memory is located within the ECU and is coupled to the address and data buses of the CPU. The register logs the current memory address of the non-volatile memory, when the controller determines the current memory address is a memory address of interest. The logging buffer logs the current memory address of the non-volatile memory each time the controller determines the current memory address is a memory address of interest.

15 Claims, 4 Drawing Sheets

ELECTRONIC CONTROL UNIT ANALYSIS

TECHNICAL FIELD

The present invention is generally directed toward an electronic control unit and, more specifically, to software performance analysis and calibration table active point detection for an electronic control unit.

BACKGROUND OF THE INVENTION

During the development of an electronic control unit (ECU) it is often desirable to use software quality assurance (SQA) tools to gather performance metrics on the operation of software running on the ECU. Data gathered by SQA tools has typically been used to look for software problems and to optimize the software architecture, i.e., to perform software performance analysis (SPA). During the development phase, it has also been desirable for a designer to monitor accesses to a calibration table of the ECU to determine what portions of the calibration table are currently being used by the software. This calibration table monitoring has generally been referred to as active point detection (APD).

Both the SPA and APD processes work by monitoring the addresses that a microprocessor of the ECU is accessing, while the software is being executed by the microprocessor. The actual data at those addresses is typically irrelevant, as it is assumed that the system is functioning correctly when these processes are used. In general, APD tools monitor the addresses of the accesses to a calibration table. By examining those addresses, a designer can determine whether the ECU is accessing the right area of the calibration table, for current operating conditions of a particular control algorithm. SPA tools work in a similar fashion in that they capture the addresses of the accesses made by the microprocessor to areas of interest. Using these addresses, the designer can monitor trends on how the software is running. This includes, but is not limited to, how often a code section runs, how often a code section is interrupted, what components of a subroutine are run, etc.

During development, various designers have utilized a logic state analyzer (LSA) to provide non-intrusive visibility into the operation of the software of the ECU, by physically probing and monitoring the external bus signals of the microprocessor. When utilized in this manner, the LSA can be used for both SPA and APD processes. However, using an LSA requires a test connector be implemented on the ECU, which if implemented in a production ECU may be intrusive to the production ECU design. For this reason, the use of an LSA is generally limited to bench work and development ECUs. Further, a LSA cannot be used for single chip processors, as such devices do not have an exposed external bus.

An alternative to using an LSA to acquire SPA and APD data is to 'instrument the code', which means adding additional code to the software to collect data. Calibration tuning has frequently utilized instrumented software processes. This is due to the fact that calibration tuning is most effective when the ECU is in the production location. In general, instrumented software processes work equally well for both development and production ECUs. When using instrumented code, subroutines are added to the areas in the code where an access to the calibration table is to occur to monitor calibration accesses. The subroutines then write the location of the calibration table access out to a data acquisition location. This allows the designer to log all access to the calibration table. However, this SPA process typically requires significant software maintenance, consumes CPU throughput, consumes memory resources, is time-intensive to maintain, and adversely affects the performance numbers as the SPA process is also consuming throughput.

An alternate software method for collecting APD data is to use a recalculation method. This method determines where in a calibration table an access took place by data logging the parameters that were used to make the access. The software in an external tool (e.g., a personal computer (PC)) then runs this logged data through the same equation that was used by the ECU to provide a list of addresses that were used to access the calibration table. This process also requires significant bandwidth, to capture every access made to the calibration table, such that most designers limit data acquisition to a subset of data points that can be used to indicate a trend of where the calibration table accesses are occurring. Further, even if the data stream from the ECU is running synchronously with the fastest loop of the ECU, there is a potential for data framing errors. Additionally, during development, the algorithm running in the ECU is required to be synchronized with the algorithm running on the tool. If synchronization is not maintained, the calibration table is optimized using the wrong equations.

What is needed is a technique for performing software performance analysis (SPA) and active point detection (APD) on an electronic control unit (ECU) without requiring the use of a logic analyzer. It would also be desirable if the technique for performing SPA and APD did not require implementation of a test connector on the ECU.

SUMMARY OF THE INVENTION

The present invention is directed to a system for acquiring information on the operation of an electronic control unit (ECU). According to one embodiment of the present invention, the system includes a controller and a non-volatile memory. The controller is coupled to the address and data buses of a central processing unit (CPU), which is located within the ECU. The controller includes a register and a logging buffer for facilitating ECU analysis. The non-volatile memory is located within the ECU and coupled to the address and data buses of the CPU. The register logs the current memory address of the access to non-volatile memory, when the controller determines the current memory address is a memory address of interest. The logging buffer sequentially logs the current memory address of accesses to the non-volatile memory each time the controller determines the current memory address is a memory address of interest.

According to another aspect of the present invention, the non-volatile memory includes at least one additional data bit for each address in the non-volatile memory. According to this aspect, the controller utilizes the at least one additional data bit in order to determine whether to log the current memory address in the register and the logging buffer when the CPU accesses the non-volatile memory.

According to another embodiment, the system also includes a first volatile memory coupled to the controller by a second data bus. According to this embodiment, an address bus of the first volatile memory is coupled to the address bus of the CPU, and the first volatile memory stores at least one additional data bit for each address in the non-volatile memory. In this embodiment, the controller utilizes the at least one additional data bit in order to determine whether to log the current memory address in the register and the logging buffer when the CPU accesses the non-volatile memory.

According to another aspect of the present invention, the system includes a first decoder coupled between the address bus of the CPU and the address bus of the first volatile memory. The first decoder is also coupled to the second data bus. According to another embodiment, the first decoder is an overlay random access memory (RAM) decoder and the first volatile memory is an overlay RAM. In one embodiment, the controller and the first volatile memory are located in an external tool. According to another embodiment, the controller and the first volatile memory are located in the ECU.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
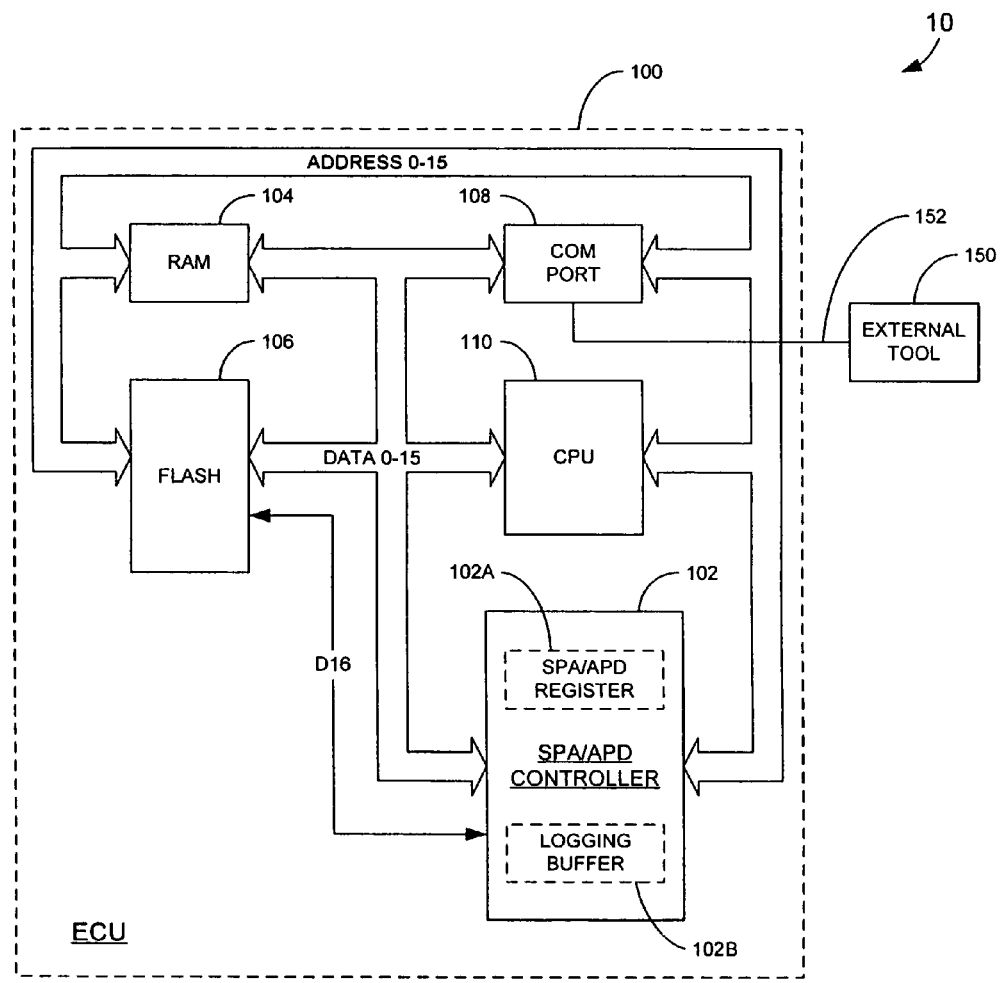
FIG. 1 is an electrical block diagram of an electronic control unit (ECU) communicating with an external tool, according to one embodiment of the present invention.

As is mentioned above, during development of an electronic control unit (ECU), it is desirable to use software quality assurance (SQA) tools to gather performance metrics on the operation of the software running on the ECU. Such tools are usually referred to as software performance analysis (SPA) tools. The data generated by a SPA tool is used to look for problems in the software and to optimize the software architecture. In addition, during development of an ECU, a designer may also desire to take measurements on accesses to calibration tables, i.e., perform Active Point Detection (APD).

Both SPA and APD processes monitor the addresses that are accessed while the code is running. In general, the actual data at those addresses is irrelevant and it is assumed that the system is functioning correctly when these processes are used. For the APD process the addresses of the accesses to a calibration table are monitored. By looking at these addresses, the designer can then determine trends and deficiencies in how a given calibration table is used. For SPA processes, it is again only the addresses of the accesses that are of interest. Using these addresses, a designer can monitor trends on how the software is running. These trends include, but are not limited to: how often a code section runs, how often a code section is interrupted, what components of a subroutine are run, etc.

According to the present invention a designer is provided access to both SPA and APD tools without requiring utilization of a logic analyzer or that an ECU include a test connector. The present invention also allows for code monitoring without the addition of intrusive software alterations and may be implemented on single-chip processors that do not have an external bus. According to various embodiments of the present invention, a SPA/APD controller is added to an ECU system (either internal or external to the ECU) by attaching additional bits to a data field of each memory address. These additional bits may be parity or tag bits that are already manufactured into the memory or the additional bits may be implemented in an entirely separate memory device. When implemented external to the ECU, i.e., in a memory emulator, the SPA/APD controller is included within the memory emulator (external tool) and the additional bits may be located within emulation memory. Alternatively, the SPA/APD controller function may performed by the CPU of the ECU. This SPA/APD process can also be applied to processors that support burst mode and are applicable to processors with Von Neumann architectures and other digital processing architectures.

The information collected by the SPA/APD controller is available to be used and/or analyzed by the CPU of the ECU or by an external tool. The external tool may be a software program running on a PC that uploads the information, via a communication port located on the ECU. The data may be gathered in at least two forms: a histogram of all accesses to an area of interest, located in a logging buffer, or a singular data point that contains information on the most recent access to the area of interest and is stored in the SPA/APD Register.

The SPA/APD register allows a designer to monitor the most recent access to an area of interest. At any time, the external tool may query the register to determine the address of a last memory access in an area of interest. As noted above, the logging buffer provides a data histogram of all the accesses to the area of interest and may take various forms. For example, the logging buffer may be configured as a circular buffer with triggering. In this configuration, the logging buffer logs all accesses to the area of interest until a trigger condition is met. The logging buffer then collects a designated amount of post trigger data. All of the data may be accessed at a later time to provide a complete record of the accesses around the trigger condition.

The logging buffer may also be configured to time-stamp and/or ID the address of the access. In general, this implementation uses a RAM type implementation, as the implementation requires more bits than parity and tag bit implementations offer. The RAM may be a dedicated device or be implemented via an overlay RAM. The time-stamp may be generated by the controller in systems that do not support a system time-stamp.

The logging buffer may also be configured to log what code address was running before the area of interest was accessed and what code address was accessed when the CPU left the area of interest. To save logging space a designer may limit the size to the area of interest. This limitation means that only the lower address bits are logged. If the CPU is using a 32-bit address the system does not need to log all 32-bits of address. If the user is willing to limit the area of interest to 16K, for example, the 16K area only requires 15-bits of data. If the dedicated SPA/APD memory was a 32-bit device the other 17-bits can be used for other processes, such as timestamp, entrance/exit data, etc.

Referring to FIG. 1, a system 10 includes an electronic control unit (ECU) 100, constructed according to one embodiment of the present invention, communicating with an external tool 150. The ECU 100 may also simultaneously control a subsystem (not shown), e.g., an engine of a motor vehicle. The external tool 150, e.g., a PC, may execute a calibration application and/or a software analysis application and is coupled, via a serial link 152 and a serial communication port 108, to a central processing unit (CPU) 110 of the ECU 100. The CPU 110 is coupled, via address and data buses, etc., to a non-volatile memory 106 and a volatile memory 104. The non-volatile memory 106 may be, for example, a flash memory and the volatile memory 104 may be a static random access memory (SRAM), whose size is application specific. The memory 106 is utilized at least, in part, to store calibration constants that may, during development, be modified by a user of the external tool 150.

A software performance analysis/active point detection (SPA/APD) controller 102 is coupled to the memories 104 and 106 and the CPU 110. The controller 102 includes a logging buffer 102B and a SPA/APD register 102A. In this embodiment, the memory 106 includes one extra data bit (i.e., this bit can be used to monitor SPA memory accesses or APD accesses) D16, which the controller 102 uses to monitor CPU 110 accesses to the memory 106. The extra bit may be added to the system by using a flash memory that supports extra bits. As is shown, bit D16 is routed to the controller 102, which uses the bit D16 to monitor the CPU 110 accesses to the memory 106. The controller 102 supports both the SPA/APD Register 102A (to obtain the most recent access information) and the logging buffer 102B (to support histograms).

The code located within the memory 106 is programmed with the appropriate SPA/APD bit set to provide coverage over the code or tables of interest. For each address that the CPU 110 accesses the controller 102 receives a bit of information that allows it to monitor the activity. As is shown in Table 1 below, the SPA/ADP bit changes from 0 for normal code to a 01 for the code sections of interest. The controller 102 logs the address of the access to the area of interest (01 in Table 1) in the logging buffer 102B and places the most current address in the register 102A.

TABLE 1

| Address | OP Code | Line | Assembly | SPA/APD Bit |
|---|---|---|---|---|
| 000000e4 | 0000 015a ffff | 499 | .d1line 346 | 0 |
| 000000ea | 0000 00e8 | | | 0 |
| 000000e8 | 8181 000c | 500 | lwz r12,12(r1) | 0 |
| | | 501 | #$$vo | |
| 000000ec | 8161 0010 | 502 | lwz r11,16(r1) | 0 |
| | | 503 | #$$vo | 0 |
| 000000f0 | 3d20 0000 | 504 | addis r9,r0,pToolPresPat@ha | 0 |
| 000000f4 | 7c8c 5a14 | 505 | add r4,r12,M1 | 0 |
| | | 506 | # | |
| | | 507 | # /* Locate Tool enable. */ | |
| | | 508 | # pToolPresPat = (UINT16 *) (&pGlobalData->presence_pattern); | |
| 000000ee | 0000 015d ffff | 509 | .d1line 349 | 1 |
| 00000f4 | 0000 00f8 | | | 1 |
| 000000f8 | 38c4 00dc | 510 | addi r6,r4,220 | 1 |
| 000000fc | 90c9 0000 | 511 | stw r6,pToolPresPat@l(r9) | 1 |
| | | 512 | # pToolVerify = (UINT8 *) (&pGlobalData->bypass_table_change_flag); | |
| 000000f8 | 0000 015e ffff | 513 | .d1line 350 | 0 |
| 00000fe | 0000 0100 | | | 0 |
| 00000100 | 3884 00fe | 514 | addi r4,r4,254 | 0 |
| 00000104 | 3d80 0000 | 515 | addis r12,r0,pToolVerify@ha | 0 |
| 00000108 | 00 908c 0000 | 516 | stw r4,pToolVerify@l(r12) | 0 |
| | | 517 | # | |
| | | 518 | # *pToolPresPat = 0; | |
| 00000102 | 0000 0160 ffff | 519 | .d1line 352 | 0 |
| 00000108 | 0000 010c | | | 0 |
| 0000010c | b0a6 0000 | 520 | sth r5,0(r6) | 0 |
| | | 521 | #$$vo | |
| | | 522 | # *pToolVerify = 0; | 1 |
| 0000010c | 0000 0161 ffff | 523 | .d1line 353 | 0 |
| 00000112 | 0000 0110 | | | 0 |
| 00000110 | 98a4 0000 | 524 | stb r5,0(r4) | |
| | | 525 | #$$vo | |
| | | 526 | # ToolLink = 0; | 0 |
| 00000116 | 0000 0162 ffff | 527 | .d1line 354 | 0 |
| 0000011c | 0000 0114 | | | 0 |
| 00000114 | 3d60 0000 | 528 | addis r11,r0,ToolLink@ha | 0 |
| 00000118 | b0ab 0000 | 529 | sth r5,ToolLink@l(r11) | 0 |
| | | 530 | #$$vo | 0 |
| | | 531 | # ToolCommsLink = 0; | 0 |
| 00000120 | 0000 0163 ffff | 532 | .d1line 355 | 0 |
| 00000126 | 0000 011c | | | 0 |
| 0000011c | 3d80 0000 | 533 | addis 12,r0,ToolCommsLink@ha | 0 |
| 00000120 | b0ac 0000 | 534 | sth r5,ToolCommsLink@l(r12) | 0 |

Figure 2:
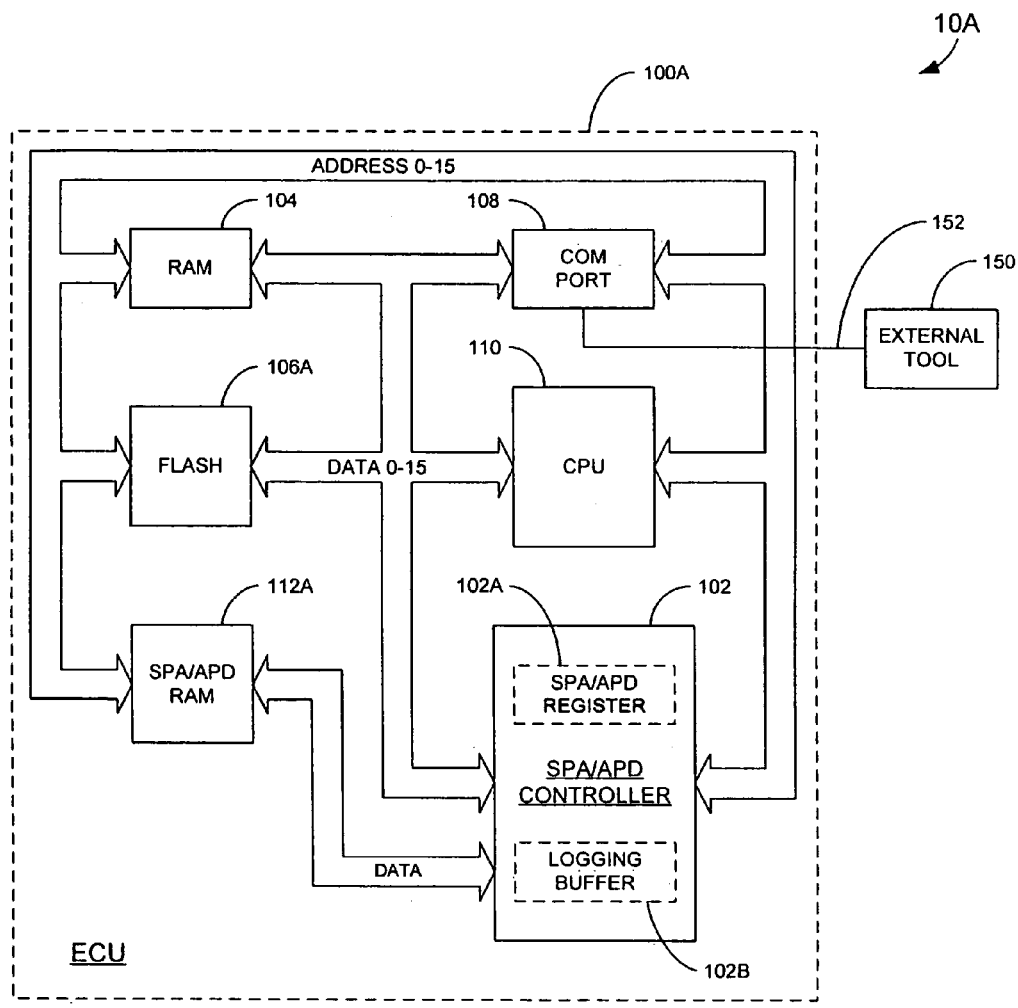
FIG. 2 is an electrical block diagram of an ECU communicating with an external tool, according to a different embodiment of the present invention.
Figure 3:
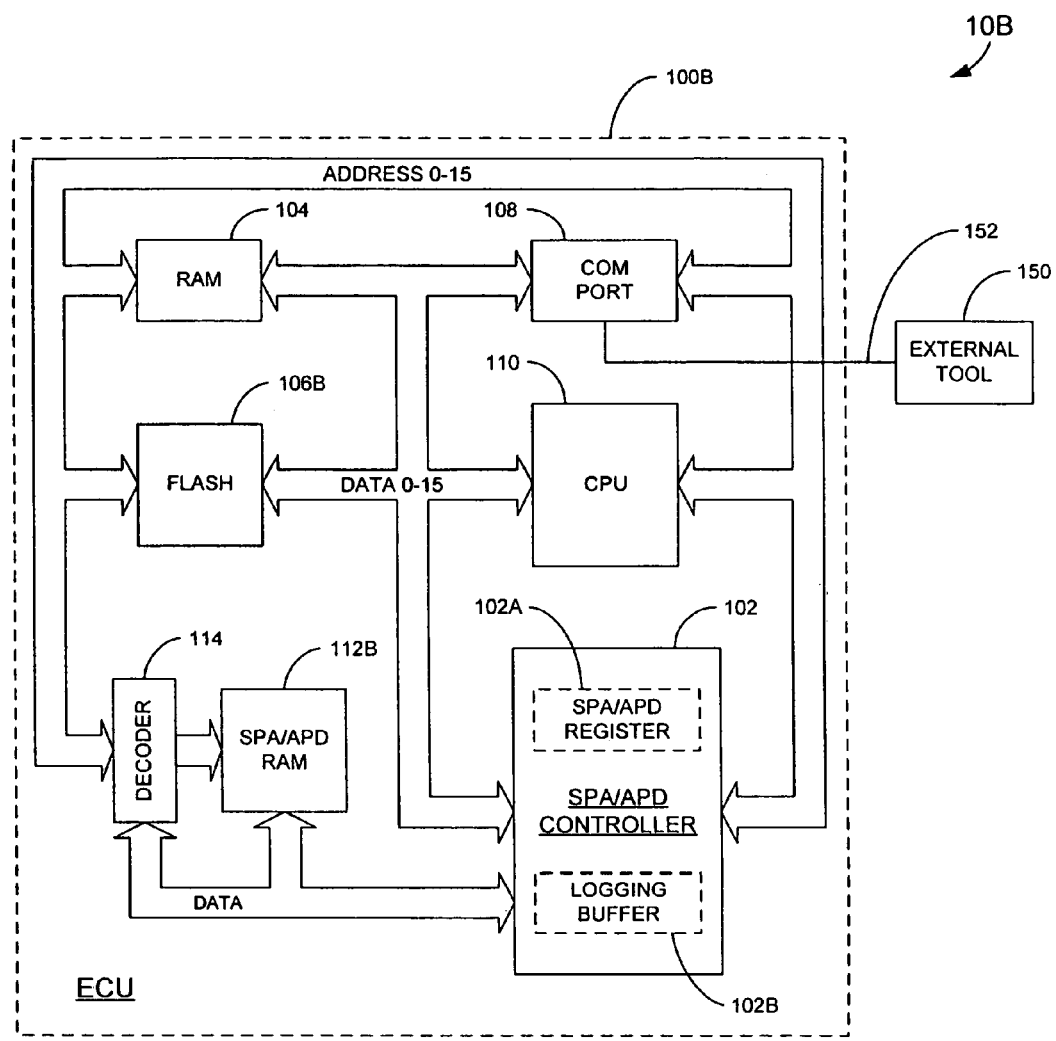
FIG. 3 is an electrical block diagram of an ECU communicating with an external tool, according to another embodiment of the present invention.

FIG. 2 shows a system 10A that is similar to the system 10 (FIG. 1), with the exception that the extra bit that was located in the memory 106 of the system 10 has been expanded to the number of bits located in an additional volatile memory 112A. This implementation allows a designer to generally define more areas of interest. For example, if the memory 112A is a 16-bit memory then the user can have 65,534 areas of interest. Further, in this implementation, non-volatile memory 106A does not have to be reprogrammed to reflect changes in the areas of interest and, as such, a designer can make changes in the areas of interest on the fly. In FIG. 2, it is assumed that the memory 112A is the same size as the entire code space. With reference to FIG. 3, by adding a memory decoder 114 to the system 10A of FIG. 2, system 10B can implement a smaller memory 112B that only covers the area of interest. In this embodiment, the SPA/APD bits default to an inactive state when the area of interest is not being accessed. In processors that support overlay RAM, the overlay RAM and the overlay RAM memory decoder can replace the memory 112B and the decoder 114. In this configuration, the outputs from the overlay RAM are routed to the SPA/APD controller 102.

Figure 4:
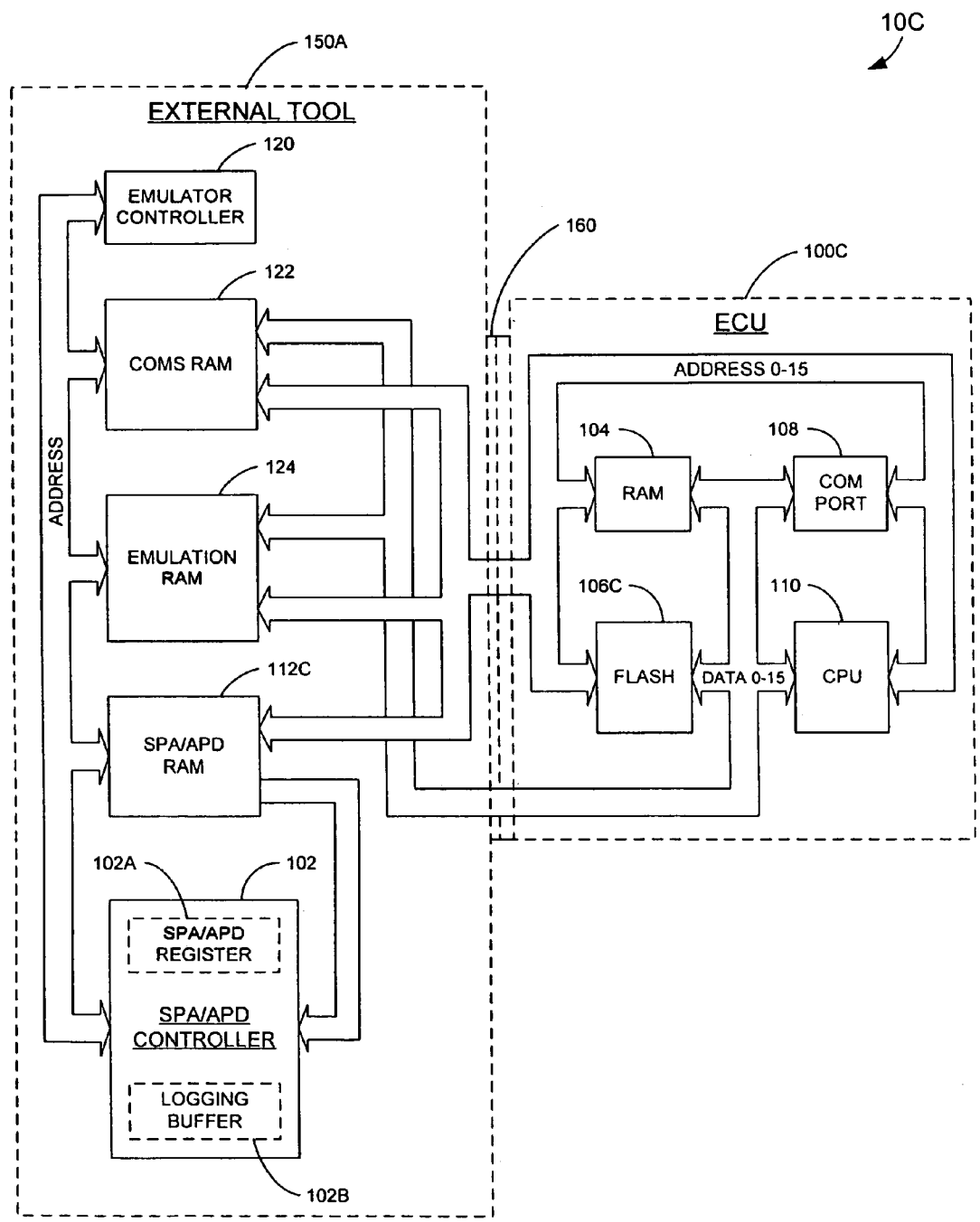
FIG. 4 is an electrical block diagram of an ECU communicating with an external tool, according to yet another embodiment of the present invention.

With reference to FIG. 4, a system 10C is depicted where the SPA/APD controller 102A is migrated into the development tool and out of ECU 100C. In this embodiment, the extra bits that were provided by the RAM 112B of FIG. 2 are located in a RAM 112C of external tool 150A. In this embodiment, the tool 150A also includes a communication RAM 122 and an emulation RAM that, along with the RAM 112C and controller 102, are coupled to an emulation controller 120.

Accordingly, an automotive electronic control unit (ECU) has been described that may function as both a production and development ECU. The ECU may also advantageously provide both SPA and APD processes.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A system for acquiring information on the operation of an electronic control unit, the system comprising:
   a controller coupled to address and data buses of a central processing unit (CPU), wherein the CPU is located within an electronic control unit (ECU), and wherein the controller includes a register and a logging buffer for facilitating ECU analysis; and
   a non-volatile memory located within the ECU and coupled to the address and data buses of the CPU, wherein the register logs a current memory address of the non-volatile memory when the controller determines the current memory address is a memory address of interest, and wherein the logging buffer logs the current memory address of the non-volatile memory each time the controller determines the current memory address is a memory address of interest.

2. The system of claim 1, wherein the non-volatile memory includes at least one additional data bit for each address in the non-volatile memory, and wherein the controller utilizes the at least one additional data bit in order to determine whether to log the current memory address in the register and the logging buffer when the CPU accesses the non-volatile memory.

3. The system of claim 1, further comprising:
   a first volatile memory coupled to the controller by a second data bus, wherein an address bus of the first volatile memory is coupled to the address bus of the CPU, and wherein the first volatile memory stores at least one additional data bit for each address in the non-volatile memory, where the controller utilizes the at least one additional data bit in order to determine whether to log the current memory address in the register and the logging buffer when the CPU accesses the non-volatile memory.

4. The system of claim 3, further comprising:
   a first decoder coupled between the address bus of the CPU and the address bus of the first volatile memory, wherein the first decoder is coupled to the second data bus.

5. The system of claim 4, wherein the first decoder is an overlay random access memory (RAM) decoder and the first volatile memory is an overlay RAM.

6. The system of claim 3, wherein the controller and the first volatile memory are located in an external tool.

7. The system of claim 3, wherein the controller and the first volatile memory are located in the ECU.

8. The system of claim 1, wherein the ECU analysis includes software performance analysis (SPA) and active point detection (APD).

9. A system for acquiring information on the operation of an electronic control unit, the system comprising:
   a controller coupled to address and data buses of a central processing unit (CPU), wherein the CPU is located within an electronic control unit (ECU), and wherein the controller includes a register and a logging buffer for facilitating ECU analysis, wherein the ECU analysis includes software performance analysis (SPA) and active point detection (APD); and
   a non-volatile memory located within the ECU and coupled to the address and data buses of the CPU, wherein the register logs a current memory address of the non-volatile memory when the controller determines the current memory address is a memory address of interest, and wherein the logging buffer logs the current memory address of the non-volatile memory each time the controller determines the current memory address is a memory address of interest.

10. The system of claim 9, wherein the non-volatile memory includes at least one additional data bit for each address in the non-volatile memory, and wherein the controller utilizes the at least one additional data bit in order to determine whether to log the current memory address in the register and the logging buffer when the CPU accesses the non-volatile memory.

11. The system of claim 9, further comprising:
   a first volatile memory coupled to the controller by a second data bus, wherein an address bus of the first volatile memory is coupled to the address bus of the CPU, and wherein the first volatile memory stores at least one additional data bit for each address in the non-volatile memory, where the controller utilizes the at least one additional data bit in order to determine whether to log the current memory address in the register and the logging buffer when the CPU accesses the non-volatile memory.

12. The system of claim 11, further comprising:
   a first decoder coupled between the address bus of the CPU and the address bus of the first volatile memory, wherein the first decoder is coupled to the second data bus.

13. The system of claim 12, wherein the first decoder is an overlay random access memory (RAM) decoder and the first volatile memory is an overlay RAM.

14. The system of claim 11, wherein the controller and the first volatile memory are located in an external tool.

15. The system of claim 9, wherein the controller and the first volatile memory are located in the ECU.

* * * * *